(12) United States Patent
Warr (10) Patent No.: US 9,057,221 B2
(45) Date of Patent: Jun. 16, 2015

(54) CAB MODULE FOR A MINING MACHINE

(71) Applicant: Harnischfeger Technologies, Inc., Wilmington, DE (US)

(72) Inventor: Owen J. Warr, Muskego, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 0 days.

(21) Appl. No.: 13/691,920

(22) Filed: Dec. 3, 2012

(65) Prior Publication Data

US 2013/0140092 A1   Jun. 6, 2013

Related U.S. Application Data

(60) Provisional application No. 61/565,794, filed on Dec. 1, 2011.

(51) Int. Cl.
*E21B 7/02* (2006.01)
*E21B 44/00* (2006.01)
*E02D 17/13* (2006.01)
*E02F 9/16* (2006.01)
*B60N 2/46* (2006.01)

(52) U.S. Cl.
CPC . *E21B 7/02* (2013.01); *E21B 44/00* (2013.01); *E21B 7/022* (2013.01); *E02D 17/13* (2013.01); *E02F 9/166* (2013.01); *B60N 2/4693* (2013.01)

(58) Field of Classification Search
CPC ........... E21B 7/02; E21B 7/022; E21B 44/00; B60N 2/4693; E02D 17/13; E02F 9/166
USPC ........ 180/326; 175/219; 701/50; 296/197.07, 296/197.11
See application file for complete search history.

(56) References Cited

U.S. PATENT DOCUMENTS

| 3,522,839 A | 8/1970 | Wendt et al. |
| 3,776,358 A | 12/1973 | Williams |
| 3,868,896 A | 3/1975 | Doll et al. |
| 3,983,715 A | 10/1976 | Hair, Jr. et al. |
| 4,068,728 A | 1/1978 | Subrick |

(Continued)

FOREIGN PATENT DOCUMENTS

| AU | 2007202415 | 5/2008 |
| AU | 2006243875 | 6/2008 |

(Continued)

OTHER PUBLICATIONS

PCT/US11/26646 International Search Report and Written Opinion dated Apr. 13, 2011 (13 pages).

(Continued)

*Primary Examiner* — Paul N Dickson
*Assistant Examiner* — Timothy Wilhelm
(74) *Attorney, Agent, or Firm* — Michael Best & Friedrich LLP (57) ABSTRACT

A seat module for an industrial machine. The industrial machine includes a base, a body, and a cab module supporting the seat module. The seat module includes a seat, a control panel mounted on the seat, one or more monitors attached to the control panel, and a plurality of controls positioned on the control panel. The seat module also includes a controller having a processor and connected to the control panel. The controller is configured to receive information from the plurality of controls and to control the operation of the industrial machine based on the received information.

20 Claims, 8 Drawing Sheets

(56) References Cited

U.S. PATENT DOCUMENTS

| | | | |
|---|---|---|---|
| 4,120,527 A | 10/1978 | Lawrence | |
| 4,278,144 A | 7/1981 | Perin | |
| 4,294,082 A | 10/1981 | Gerboth et al. | |
| 4,344,356 A | 8/1982 | Casterton et al. | |
| 4,467,706 A | 8/1984 | Batcheller et al. | |
| 4,480,867 A | 11/1984 | Ezell et al. | |
| 4,492,151 A | 1/1985 | Mattei | |
| 4,612,975 A | 9/1986 | Ikari | |
| 4,616,725 A | 10/1986 | McDaniel | |
| 4,771,855 A | 9/1988 | Takashima et al. | |
| 4,846,529 A | 7/1989 | Tulley | |
| 5,275,255 A | 1/1994 | Huntley et al. | |
| 5,308,279 A | 5/1994 | Grinberg | |
| 5,318,100 A | 6/1994 | Aoki | |
| 5,799,746 A | 9/1998 | Kortelainen et al. | |
| 5,890,764 A | 4/1999 | Lee | |
| 5,992,156 A | 11/1999 | Isobe et al. | |
| 6,012,295 A | 1/2000 | Isobe et al. | |
| 6,022,182 A | 2/2000 | Everett | |
| 6,039,141 A * | 3/2000 | Denny | 180/329 |
| 6,095,263 A * | 8/2000 | Saunders et al. | 175/219 |
| 6,186,573 B1 | 2/2001 | Thurab | |
| 6,196,308 B1 | 3/2001 | Halligan | |
| 6,220,656 B1 | 4/2001 | Martin, Jr. | |
| 6,446,738 B1 * | 9/2002 | Boyd | 175/219 |
| 6,543,848 B1 | 4/2003 | Suehiro et al. | |
| 6,557,919 B2 | 5/2003 | Hijikata et al. | |
| 6,572,172 B1 | 6/2003 | Ninomiya et al. | |
| 6,578,854 B2 | 6/2003 | Wucherpfennig et al. | |
| 6,629,572 B2 * | 10/2003 | Womer et al. | 175/219 |
| 6,684,969 B1 | 2/2004 | Flowers et al. | |
| 6,688,682 B2 | 2/2004 | Arthur et al. | |
| 6,729,031 B2 | 5/2004 | McKee | |
| 6,755,270 B2 | 6/2004 | Saarinen | |
| 6,955,009 B2 | 10/2005 | Rasmussen | |
| 6,955,239 B2 | 10/2005 | Ueda et al. | |
| 6,981,746 B2 | 1/2006 | Chung et al. | |
| 7,032,703 B2 * | 4/2006 | Wulfert et al. | 180/329 |
| 7,036,883 B1 | 5/2006 | Thompson et al. | |
| 7,059,680 B2 | 6/2006 | Billger et al. | |
| 7,069,736 B2 | 7/2006 | Kamimae et al. | |
| 7,083,019 B2 | 8/2006 | Chiou et al. | |
| 7,086,241 B2 | 8/2006 | Holt | |
| 7,159,687 B2 | 1/2007 | Dunn et al. | |
| 7,243,982 B2 * | 7/2007 | Kelley et al. | 296/190.08 |
| 7,294,181 B1 | 11/2007 | Smith | |
| 7,347,299 B2 | 3/2008 | Billger et al. | |
| 7,434,863 B2 | 10/2008 | Hamazaki et al. | |
| 7,520,567 B2 | 4/2009 | Billger et al. | |
| 7,575,276 B1 | 8/2009 | Henry | |
| 7,607,722 B2 * | 10/2009 | Frett et al. | 296/190.04 |
| 7,681,630 B2 | 3/2010 | Klassen et al. | |
| 7,699,328 B2 | 4/2010 | Crawford | |
| 8,056,617 B2 | 11/2011 | Klassen et al. | |
| 2003/0070900 A1 | 4/2003 | Elwell | |
| 2003/0230447 A1 | 12/2003 | Wulfert et al. | |
| 2006/0061122 A1 | 3/2006 | Billger et al. | |
| 2006/0144634 A1 | 7/2006 | Portscheller et al. | |
| 2007/0145759 A1 * | 6/2007 | Crawford et al. | 296/1.01 |
| 2009/0218327 A1 * | 9/2009 | Beeson | 219/133 |
| 2009/0276122 A1 | 11/2009 | Demong et al. | |
| 2010/0126188 A1 | 5/2010 | Clarke | |
| 2010/0300796 A1 | 12/2010 | Ryan et al. | |
| 2012/0068478 A1 | 3/2012 | Nania | |
| 2012/0204589 A1 | 8/2012 | Krellner et al. | |
| 2012/0224941 A1 | 9/2012 | Peterson et al. | |
| 2013/0004273 A1 | 1/2013 | Webb | |

FOREIGN PATENT DOCUMENTS

| | | |
|---|---|---|
| AU | 2008247324 | 11/2008 |
| AU | 2007216811 | 4/2009 |
| DE | 9204392 | 5/1992 |
| DE | 102006018537 | 11/2007 |
| EP | 1669225 | 6/2006 |
| GB | 1022623 | 3/1966 |
| GB | 1126449 | 9/1968 |
| JP | 2006232010 | 9/2006 |
| JP | 2010215143 | 9/2010 |
| PL | 141849 | 8/1987 |
| PL | 174838 | 9/1998 |
| WO | 2009050747 | 4/2009 |

OTHER PUBLICATIONS

Buchsbaum, Foresight Energy Invests in Illinois: The Cline Group constructs four underground coal mining complexes, Coal Age, Dec. 2010, pp. 36-53.

Search Report from the Patent Office of the Republic of Poland for Application No. P-398070 dated May 9, 2012 (2 pages).

Search Report from the United Kingdom Intellectual Property Office for Application No. 1202267.9 dated Jun. 27, 2012 (4 pages).

Patent Examination Report No. 1 from IP Australia for Application No. 2012258458 dated Oct. 10, 2013 (3 pages).

First Patent Examination Report from the Intellectual Property Office of Australia for Application No. 2012200739 dated Mar. 19, 2014 (4 pages).

PCT/US2011/026646 International Preliminary Report on Patentability and Written Opinion dated Sep. 12, 2013 (9 pages).

Office Action from the United States Patent and Trademark Office for U.S. Appl. No. 13/037,878 dated Jan. 7, 2013 (26 pages).

Second Patent Examination Report from the Intellectual Property Office of Australia for Application No. 2012258458 dated Apr. 28, 2014 (4 pages).

Office Action from the United States Patent and Trademark Office for U.S. Appl. No. 13/369,622 dated Jun. 10, 2014 (7 pages).

* cited by examiner

CAB MODULE FOR A MINING MACHINE

CROSS-REFERENCE TO RELATED APPLICATIONS

This application claims priority to U.S. Provisional Application No. 61/565,794, filed on Dec. 1, 2011, which is incorporated herein by reference in its entirety.

BACKGROUND

The present invention relates to mining machines. More specifically, the invention relates to an operator's compartment (also called a cab) and an improved seat module for the operator's compartment for a blasthole drill.

SUMMARY

Blasthole drills are widely used in the surface mining industry. The main purpose of the blasthole drill is to provide a "blasthole" into which explosives can be loaded. Safe and efficient drilling practices include carefully planning and monitoring the drill's operation and its parameters, taking into consideration the geological changes during drilling, and effectively communicating to the rest of the drilling team any conditions encountered during drilling that may affect the results or may require any changes of the drilling process. Therefore, the drill operator needs to operate the drill via safe, convenient, and technologically advanced compartment that will allow him or her to achieve the best possible results.

In one embodiment, the invention provides a seat module for an industrial machine. The industrial machine includes a base, a body, and a cab module supporting the seat module. The seat module includes a seat, a control panel mounted on the seat, one or more monitors attached to the control panel, and a plurality of controls positioned on the control panel. The seat module also includes a controller having a processor and connected to the control panel. The controller is configured to receive information from the plurality of controls and to control the operation of the industrial machine based on the received information.

In another embodiment, the invention provides a cab module for an industrial machine. The industrial machine includes a base, a body, a first end, a drill mast located near the first end, and a second end. The cab module includes a front portion constructed from one or more safety glass panels, a first side portion and a second side portion, each side portion including a door constructed from safety glass. The cab module further includes a back portion and a top portion defining an inclined surface, wherein the cab module is positioned at the first end of the industrial machine.

In yet another embodiment, the invention provides a cab module unit for an industrial machine. The industrial machine includes a base and a body. The cab module unit includes a front portion constructed from one or more safety glass panels, a first side portion and a second side portion, each side portion including a door constructed from safety glass. The cab module unit also includes a back portion, a top portion defining an inclined surface, and a seat module. The seat module includes a seat, a control panel mounted on the seat, one or more monitors attached to the control panel, a plurality of controls positioned on the control panel, and a controller connected to the control panel. The controller includes a processor, and the controller is configured to receive information from the plurality of controls and to control the operation of the industrial machine based on the received information

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

Figure 1:
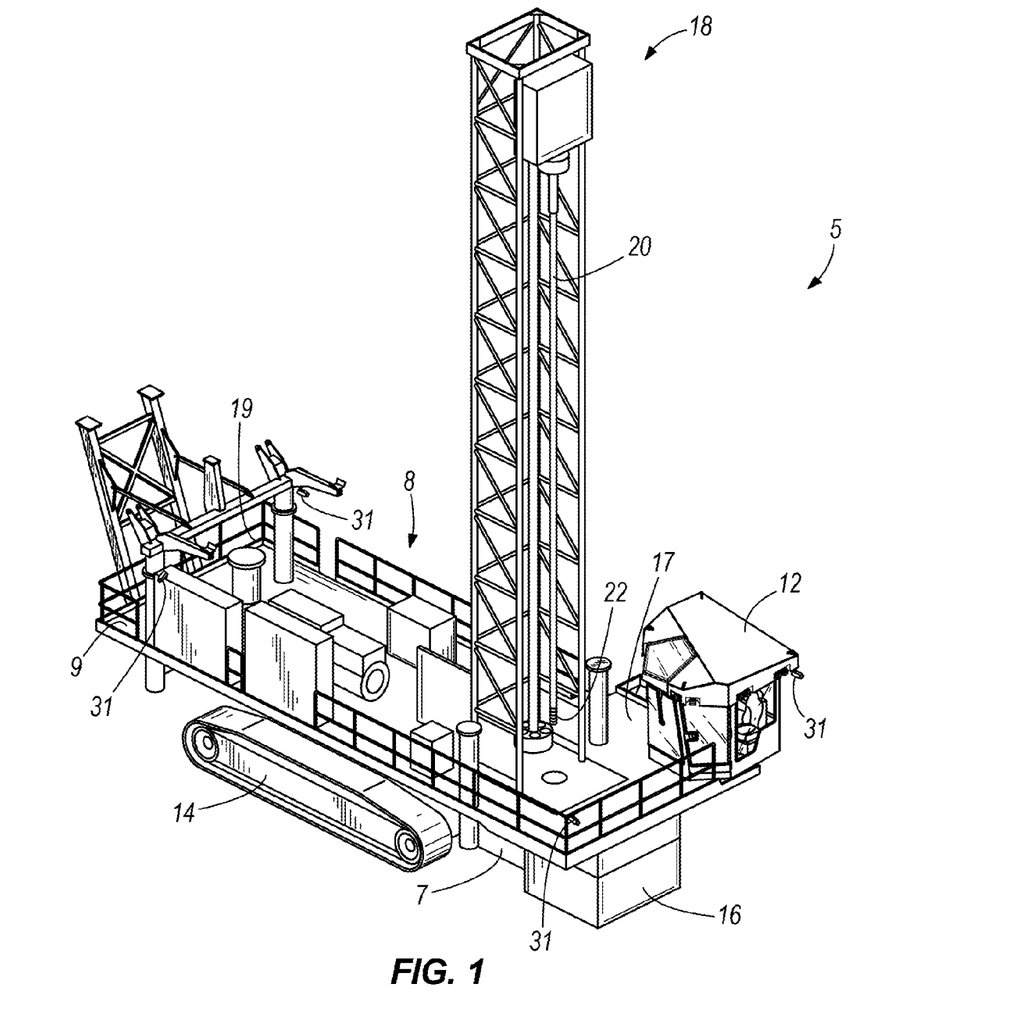
FIG. 1 is a perspective view of a mining machine that includes an operator's compartment.
Figure 2:
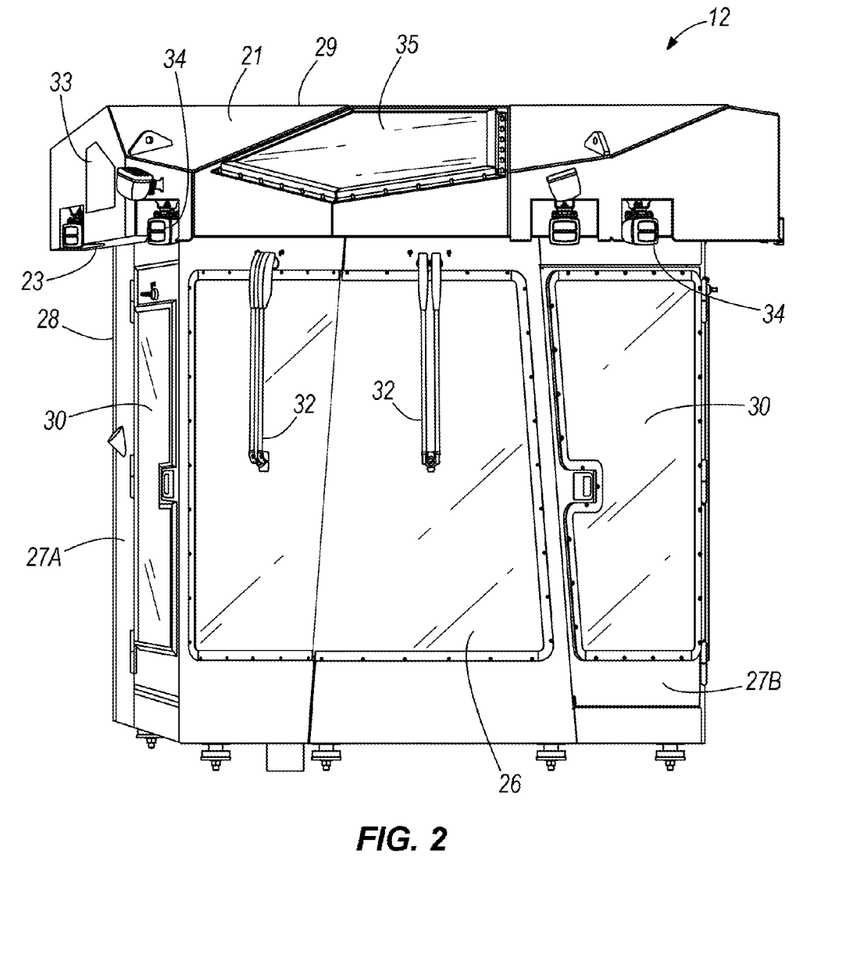
FIG. 2 is a front view of the operator's compartment of FIG. 1.
Figure 3:
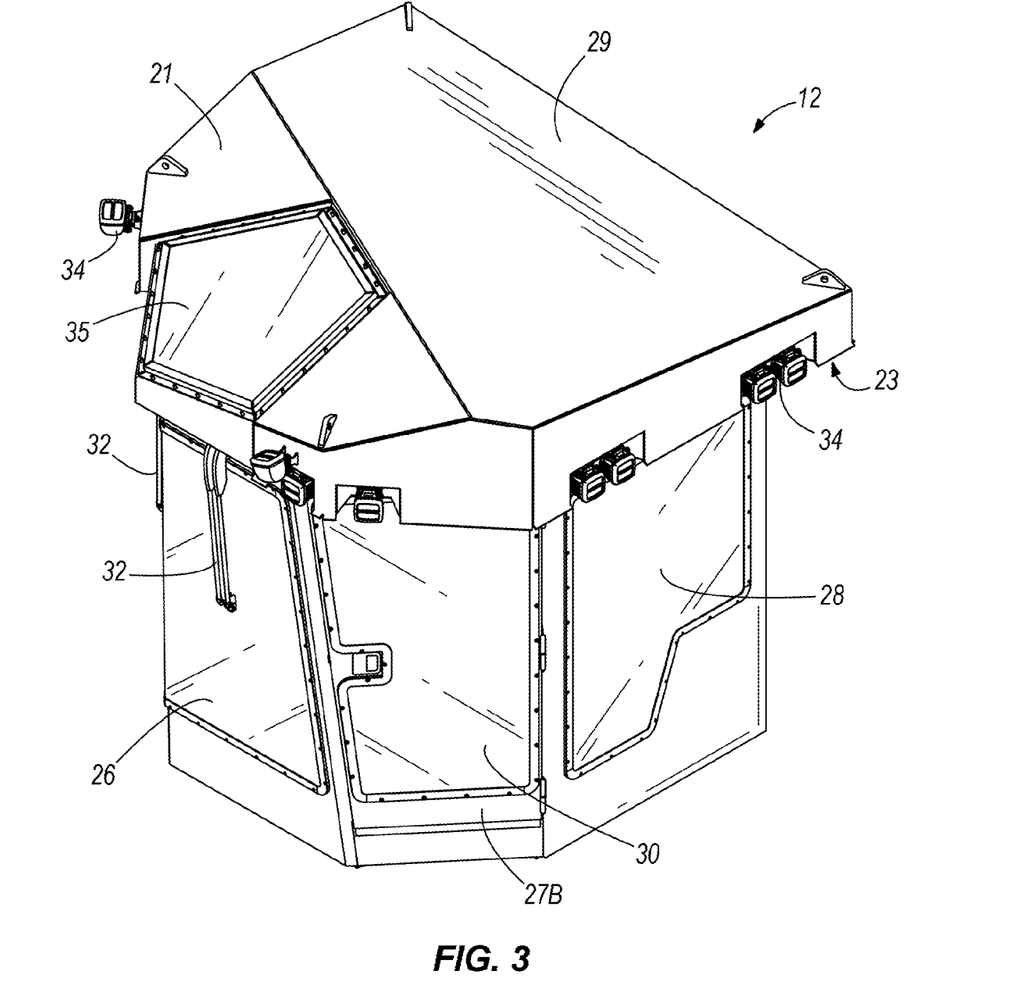
FIG. 3 is a perspective view of the operator's compartment of FIG. 1.
Figure 4:
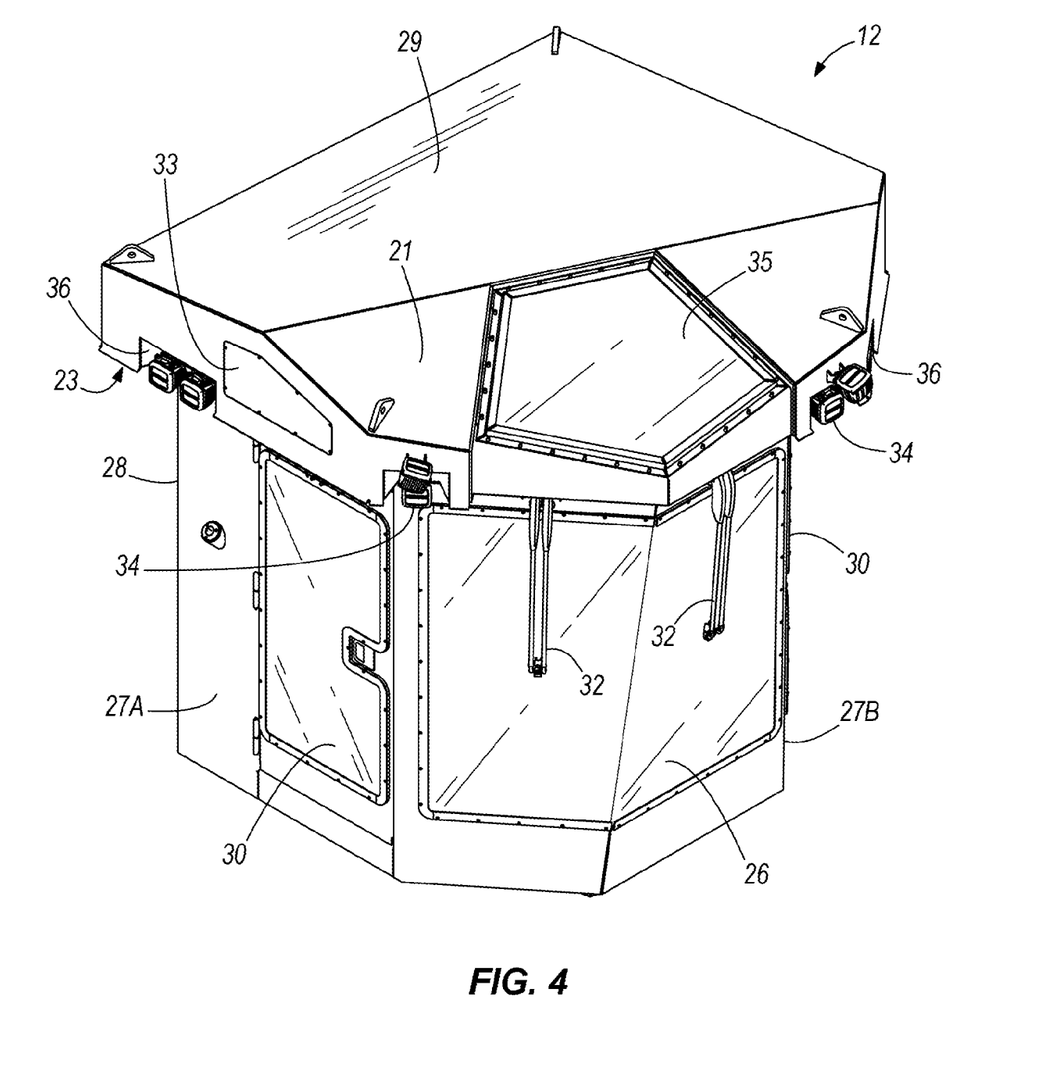
FIG. 4 is an alternative perspective view of the operator's compartment of FIG. 1.

Although the invention described herein can be applied to or used in conjunction with a variety of industrial machines (e.g., a blasthole drill, a rope shovel, a dragline, hydraulic machines, etc.), embodiments of the invention described herein are described with respect to a blasthole drill, such as the blasthole drill 5 shown in FIG. 1. The blasthole drill 5 of FIG. 1 is generally of the type used during surface mining operations. The blasthole drill 5 includes a base 7, a body 8 including a machinery deck 9, and an operator's compartment or cab module 12 supported, at least partially, on a portion of the deck 9. In one embodiment, the blasthole drill 5 is movable by drive tracks 14 and when in operational position is supported by at least one supporting structure 16. The blasthole drill 5 defines a first end 17 where a drill mast 18 is located, and a second end 19 opposite to the first end 17. In the illustrated construction, the operator's compartment 12 is positioned adjacent to the drill mast 18 near the first end 17 of blasthole drill 5.

The drill mast 18 of the blasthole drill 5 includes a drill steel 20 and a drill bit 22 that are used to drill holes in the ground during the surface mining operation. The drill mast 18 also includes a pulldown/hoist mechanism (not shown) powered by a hydraulic or an electric motor (not shown) that provides turning torque to the pulldown/hoist mechanism through a geared hoist transmission (not shown). During typical operation, the blasthole drill 5 is positioned on the top of a predetermined area. Once the blasthole drill 5 is securely leveled to the ground by using leveling controls, the operator operates the steel 20 of the blasthole drill 5 to drill holes into the ground.

FIGS. 2-5 illustrate one embodiment of the operator's compartment or cab module 12. The operator's compartment 12 defines a front portion 26, two side portions 27A and 27B, a back portion 28, and a top portion 29 (i.e., a roof). The portions of the operator's compartment define an enclosure that can be entered through either of two doors 30 positioned at the side portions 27A and 27B. The front portion 26 of the cab 12 is constructed from one or more safety glass panels that extend predominately from the deck 9 of the blasthole drill 5 to the top portion 29 of the cab. In one construction, the glass panels of the cab 12 are asymmetrical. Alternatively, the front portion 26 of the cab 12 can be constructed from any other suitable material, which is durable and allows visibility. In one embodiment, the side portions 27A and 27B, the back portion 28, and the top portion 29 are constructed from metal (e.g., steal) or any other suitable material.

One of the doors 30 is generally located near the drill mast 18 at the first end 17 of the drill 5. A stairway (not shown) mounted to the deck 9 and located near the cab 12 allows the operator to enter the cab 12. Both doors 30 can be hinged on separate support panels. In some embodiments, the doors 30 can also be constructed from safety glass to increase the visibility of the operator seated in the cab 12. The use of two doors 30 can allow an operator to enter or exit the cab 12 in either direction or from any seated position. Other embodiments may include a single door or more than two doors. Wipers 32 are mounted on every glass panel except the door 30 and the back portion 28 of the cab 12.

The roof 29 of the cab 12 defines an inclined surface 21. That surface 21 is designed to discourage people from climbing on the roof 29. Further, the lack of handrails on or around the roof 29 provides additional discouragement to climbing the roof 29. In addition, the inclined roof surface 21 allows for easy removal and dispersal of snow, rain, or debris. One of the sides of the roof includes a removable access panel 33 that provides access to the electrical system of the cab 12. That way, a user does not have to weld or drill through the sidewalls of the cab when updating or repairing the electrical system. The roof 29 defines an underside portion 23 (also called a soffit) that extends outwardly from the top edge of portions 26 and 27 of the cab 12. A plurality of lights 34 are mounted within a plurality of openings 36 positioned in different locations throughout the underside portion 23 of the roof 29. Tie off lanyards (not shown), that are used to accommodate a fall arrest system, are also located within the openings of the cab roof and are spaced about the cab. A user can connect a safety harness to the tie off lanyards.

The roof 29 of the cab 12 further includes a top surface window 35. In one embodiment, the top surface window 35 is positioned in the front portion of the roof 29. Alternatively, the top surface window can be positioned at the end or the side portions of the roof 29. The top surface window 35 is constructed from bulletproof material and is supported by a steel support structure (not shown) positioned under the window 35. This configuration of the top surface window 35 is more secure and durable in comparison to the conventional cab window, which includes steel supports outside the window glass. The top surface window 35 provides a higher protection to the operator of the cab 12.

All elements of the operator's compartment 12 are constructed in accordance with the Failing Object Protective Structure ("FOPS") certification standards. Specifically, the illustrated operator's compartment 12 has a FOPS level II certification (Reference ISO 3449:2005 FOPS). This construction of the operator's compartment 12 makes it safer than conventional cab modules which generally have FOPS level I certification.

Figure 5:
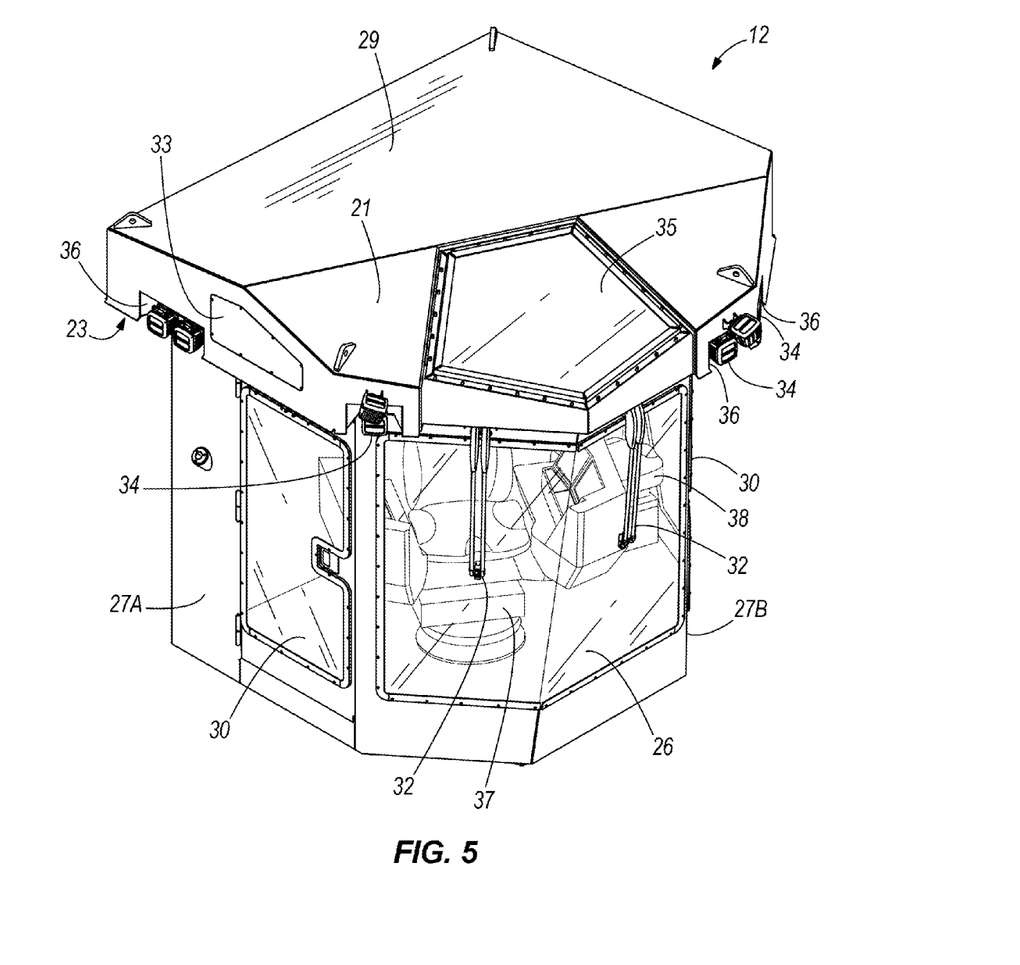
FIG. 5 is a perspective view of the operator's compartment of FIG. 1 and an operator's seat module positioned at the operator's compartment.

With continued reference to FIG. 5, the operator's compartment 12 also includes a rotatable operator's seat module 37, described further below, a "buddy seat" 38, and a storage area (not shown). In one embodiment, the buddy seat 38 is positioned near the back portion 28 of the cab 12. The buddy seat 38 incorporates a refrigerator (e.g., a drawer-type) underneath the seat 38 and a three-point safety harness (i.e., a seat belt). In one embodiment, the storage area 40 is positioned along the back portion 28 of the cab 12. For example, the storage area 40 can include storage lockers and a built-in microwave.

Figure 6:
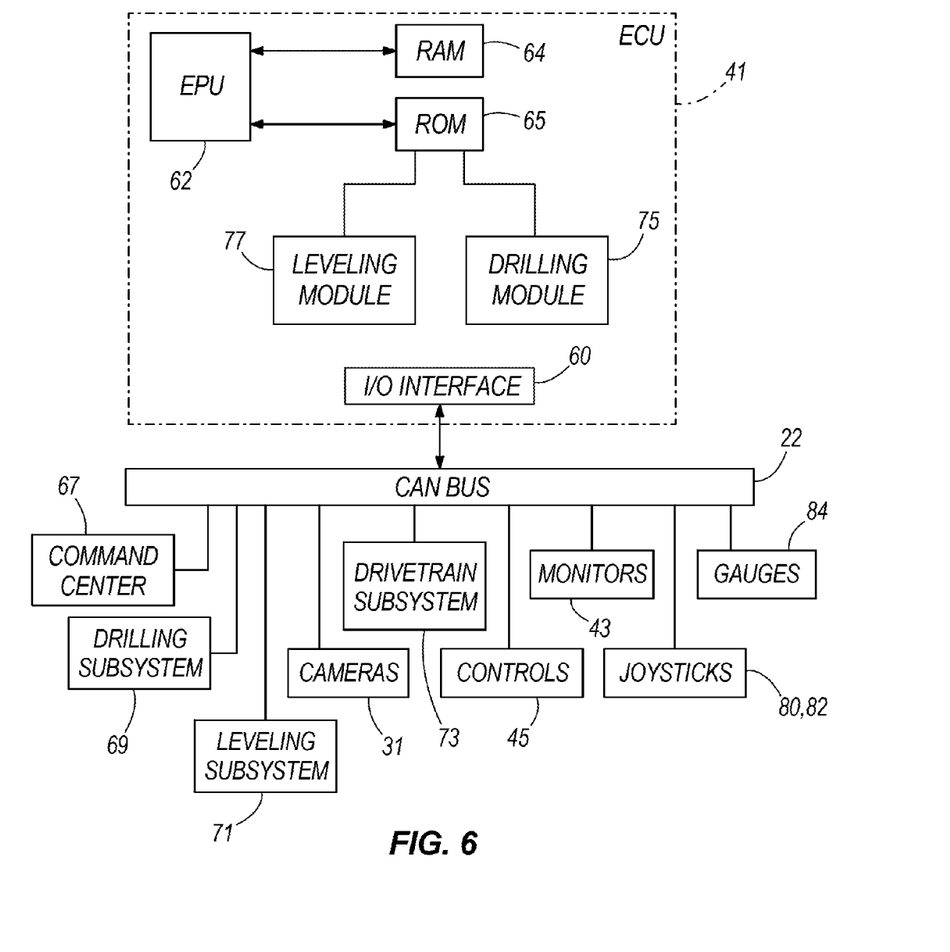
FIG. 6 is a schematic illustration of the Electronic Control Unit of the operator's seat module of FIG. 5.
Figure 7:
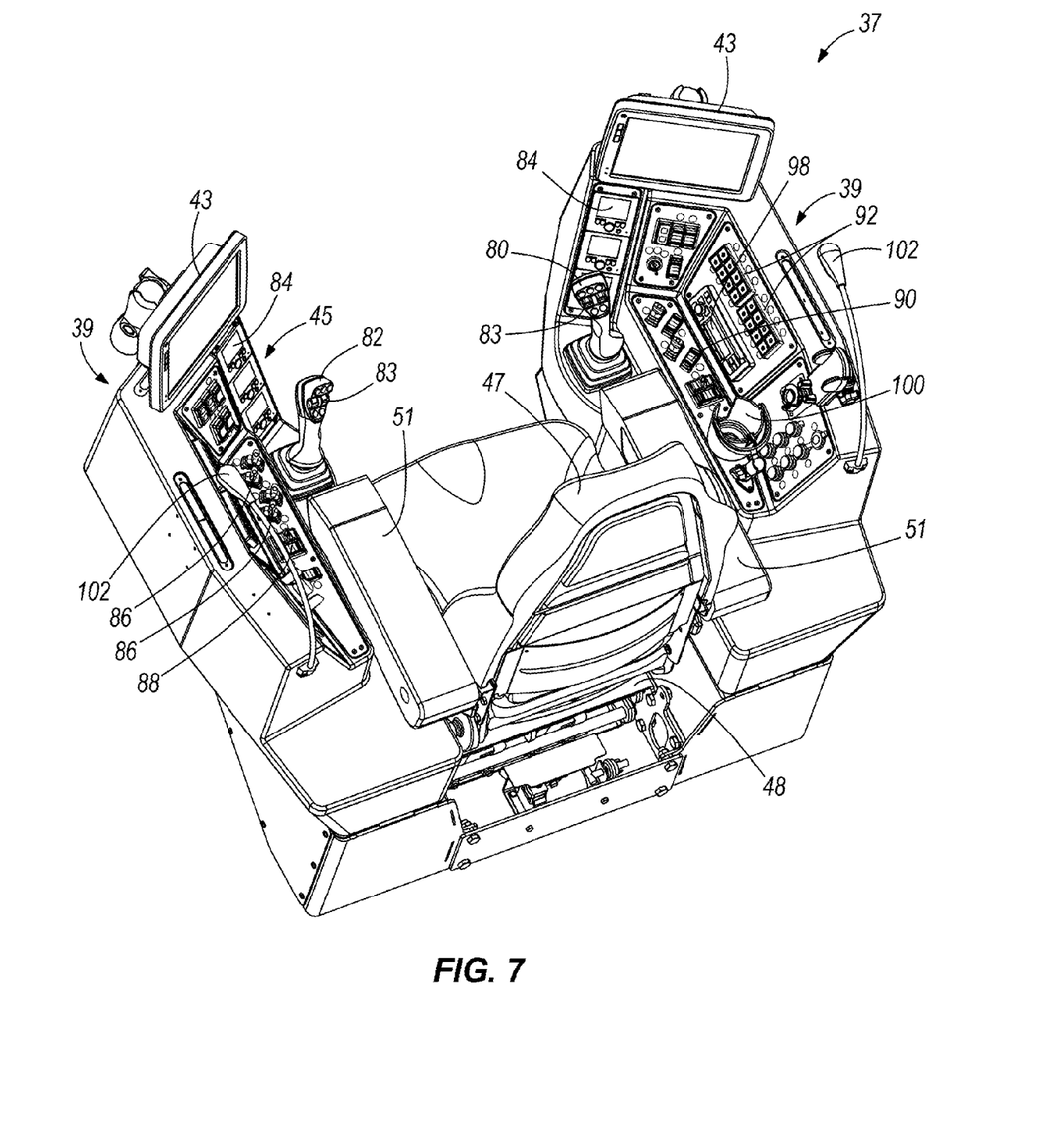
FIG. 7 is a rear view of the operator's seat module from the operator's compartment of FIG. 5.
Figure 8:
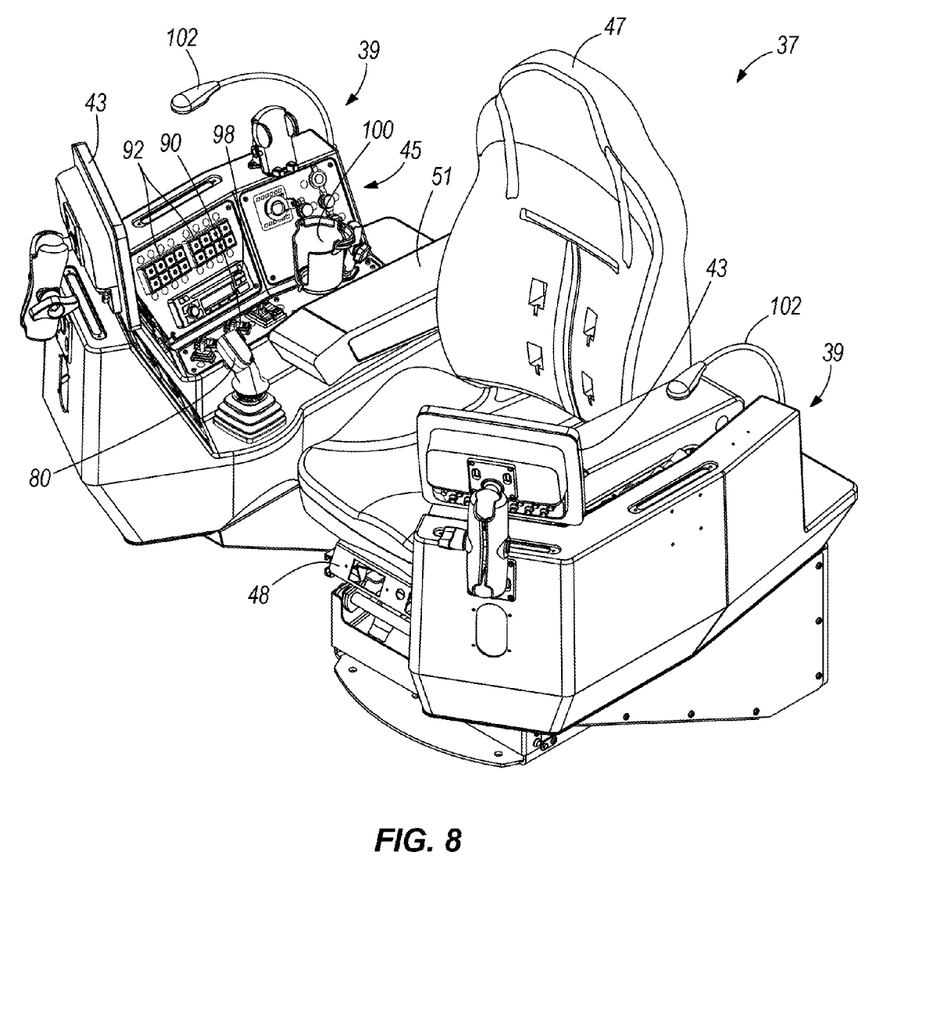
FIG. 8 is a prospective view of the operator's seat module from the operator's compartment of FIG. 5.

As best shown in FIGS. 6-8, the operator's seat module 37 includes a control panel 39 (also called a control station), an electronic control unit ("ECU") 41, one or more video monitors 43 (or graphical user interfaces) attached to the control panel 39, a plurality of controls 45 positioned on the control panel 39, and an operator's seat 47. It is to be understood that the operator's compartment 12 can be manufactured separately (i.e., without the seat module 37). However, in some embodiments, the operator's compartment 12 and the operator's seat module 37 can be pre-assembled as a unit. In this way, the operator's compartment 12 and/or the operator's seat module 37 can be installed onto a new industrial machine (e.g., blasthole drill 5) at final assembly, or retrofitted to industrial machine.

The seat 47 includes a seat base 48 supporting the seat 47. In one embodiment, the seat base 48 includes slides, linkages, guides, and the like that allow the operator to adjust the height and the distance of the seat 47 relative to the floor of the walls of the cab 12. Both the operator's seat 47 and the control panel 39 are mounted on a rotatable platform (not shown) so as to be rotatable as a unit within the operator's compartment 12. In one embodiment, the operator's seat 47 and the control panel can rotate at approximately 300 degrees to allow for full surround vision and access to all accessories in the cab 12 without moving from the operator's seat 47. The seat 47 and the control panel 39 move in unison upon an air ride suspension system. The seat 47 includes a six-way power system and a lumbar support (not shown). The seat 47 further incorporates powered heat and massage functions. The seat 47 includes two armrests 51 that are contoured and adjustable in height to allow the most comfortable position of the hands of the operator in relation to the control panel 39. The seat 47 also includes a two point safety harness system (e.g. a lap belt; not shown).

In one embodiment, rotating the seat module 37 can be accomplished by means of mechanical, hydraulic, pneumatic, or electric systems depending upon the capabilities and configuration of the blasthole drill 5 to which the operator's compartment 12 is attached. In the illustrated embodiment, a drum or a bearing (not shown) is positioned below the platform and can be rotated mechanically by the operator, or by hydraulic, pneumatic, or electrical motors (not shown) drivingly coupled to the drum by belts and pulleys, gear systems, or combinations thereof. Other embodiments may utilize hydraulic cylinders or other linear actuators coupled to an outer portion of the platform that extend and retract to rotate the platform. A stop and release mechanism (e.g., a manual brake) may be incorporated to allow manual rotation of the platform when power is not available or if there is a malfunction in any of the components that provide automated rotation of the platform. In one embodiment, the manual brake is positioned below the right armrest and near the seat cushion of the seat 47.

The control panel 39 of the cab 12 is mounted on the seat base 48. Therefore, the control panel 39 rotates together with the seat 47 during the operation of the drill 5. The present design of the cab 12 does not include any operation controls that are wall-mounted or fixed to the exterior of the cab 12. Thus, the operator can control and operate the blasthole drill 5 exclusively by using the control panel 39 on the seat 47. During operation, the operator doesn't have stand up and reach to any portion of the cabin at any given time. This allows maximum visibility for the operator during the operation of the drill 5. The control panel 39 is electronically connected to the ECU 41. The plurality of controls 45, positioned on the control panel 39, provide information (i.e., control commands) to the ECU 41 that controls the operation of the blasthole drill 5.

As shown in FIG. 6, the ECU 41 includes an input/output interface 60, an electronic processing unit ("EPU") or a processor 62, and one or more non-transitory memory modules, such as a random access memory ("RAM") 64 and read-only memory ("ROM") 65. The input/output interface 60 transmits and receives data over the bus 22, including data from the controls 45 and/or other systems of the drill 5. It should be understood that the ECU 41 can include multiple processors, additional computer-readable medium modules, multiple I/O interfaces, and/or other additional components or modules (e.g., hardware, software, or a combination thereof).

The input/output interface 60 allows the ECU 41 to communicate with other components on the drill 5 (e.g., over the CAN 22) and external to the drill 5. In other words, the input/output interface 60 can receive data and/or commands from outside the ECU 41 and can output information outside the ECU 41. For example, the input/output interface 60 can include a network interface, such as a communication device or a wireless network card that allows the system ECU 41 to send and receive information over a network, such as a local area network or the Internet. In some embodiments, the input/output interface 60 is located external to the ECU 41 and may receive data from other devices or systems located on the drill 5. In addition, although not shown in FIG. 6, conditioning circuits or peripheral drivers may be used to interface the ECU 41 with the controls 45.

In one embodiment, the ECU 41 is configured to communicate with a command center 67, drilling subsystem 69, leveling subsystem 71, and drivetrain subsystem 73. The ECU 41 is configured to receive information from these sources. The EPU 62 receives the information from the input/output interface 60 and processes the information by executing one or more instructions or modules (e.g., drilling module 75, leveling module 77, etc.). That way, the operator of the drill 5 can communicate with an external command/support team and can control various operations performed by the drill 5 via the control panel 39. The instructions or modules are stored in non-transitory computer-readable medium, such as ROM 65. The EPU 62 stores and retrieves information (e.g., information received from the bus 22 or information generated by instructions or modules executed by the EPU 62) to and from the RAM 64. The non-transitory computer readable medium 65 includes volatile memory, non-volatile memory, or a combination thereof. The computer-readable medium 65 stores operating system software, applications and/or instructions, data, or combinations thereof. It should be understood that although only a single EPU, RAM, ROM, and input/output interface are illustrated in FIG. 6, the ECU 41 can include multiple processing units, memory modules, and/or input/output interfaces.

Although the ECU 41 illustrated in FIG. 6 is as a separate component from the operator's seat module 37, in some embodiments the ECU 41 is included in the seat module 37. In other embodiments, the ECU 41 is separate from the seat module 37 to prevent faults (e.g., electrical, mechanical, or software-based) in the seat module 37 from affecting the functionality provided by the ECU 41. The ECU 41 can also be combined with other drill controllers.

The instructions stored in the computer-readable medium provide particular functionality when executed by the EPU 62. The ECU 41 includes hardware and software and these components cooperate to execute the control logic of the blasthole drill 5. As shown in FIG. 6, the input/output interface 60 of the ECU 41 receives data from the controls 45 and provides the data to the processor 62 of the ECU 41. In some embodiments, the input/output interface 60 processes the data from the controls 45 before providing the images to the processor 62 of the ECU 41. The processor 62 processes the received data and controls the operation of the drill 5 by sending appropriate command instructions to drill subsystems.

FIGS. 7 and 8 illustrate in more detail the operator's seat 47, the control panel 39, the monitors 43, and the plurality of controls 45. The monitors 43 include a display screen (e.g., a LCD display, a LED display, a touch screen display, etc.). In one embodiment, the monitors 43 are configured to receive video signals from a plurality of on-board cameras 31 positioned on the drill 5 or on the cab module 12. In one embodiment, the cameras 31 include a wide-angle lens (e.g., 180 degree lens, not shown) that is configured to captures images of the area and objects around the drill 5. The camera provides images (or image data) to the ECU 41.

The cameras 31 show the area around the drill 5 and help the operator to monitor these areas. In some embodiments, the monitors 43 are configured to operate as a Graphic User Interface (GUI) and to display various data associated with the operation of the drill 5 and its subsystems (e.g., information about the drill engine, the hydraulic pressures on the drill, etc.). Further, the monitors 43 can be configured to operate as an interface (e.g., the input/output interface 60) to help the operator to communicate with the ECU 41 and to send command signals to the ECU 41. For example, the monitors 43 can be touch screen monitors that include a plurality of icons (not shown). An operator can input data using the icons on the monitors 43 and/or can send command signals that control various operations of the drill 5.

The control panel 39 includes one or more joysticks. In one embodiment, the control panel 39 includes right and left joysticks 80 and 82 configured to control the operation of the drill 5. The joysticks 80 and 82 are positioned proximate to the ends of respective armrests 51. The joysticks 80 and 82 include controls 45 in the form of buttons and switches for operating the steering, drilling, pipehandling, tramming (i.e., propelling) and other functions of the blasthole drill 5. In some embodiments the joysticks 80 and 82 include a tram-direction switch (not shown) for setting the tram direction of the drill 5, a switch or a button (not shown) for moving or rotating the platform (e.g., left, right, or at 300 degrees), and other switches (not shown) that are used to select the speed and the direction in which the drill 5 will travel. Further, the joysticks 80 and 82 are moveable in various directions for steering the blasthole drill 5.

Pushing or pulling the joysticks 80 and 82 (e.g., along a slot between fore, neutral, and aft positions) moves the drive tracks 14 of the drill 5, thus allowing the drill 5 to move in different directions. Movement of the drill 5 is controlled with a combination of the tram-direction switch, which determines the direction in which the drill 5 will travel, and controls (not shown) that control the speed and the direction at which the drill 5 travels in the direction associated with the position of the tram-direction switch. The operation of these controls is independent of the rotational position of the platform. As such, regardless of whether the operator is facing at the first end 17 of the drill 5, or generally the second end 19, steering, movement, and drilling of the blasthole drill 5 is controlled in the same manner. Although not necessary, operators are free to rotate the platform such that they are facing generally in the direction they wish to travel.

In some embodiments, the joysticks 80 and 82 can include one or more of the following drilling controls or switches 83: a water injection on/off control, a pull down force control, a pull down speed control, a bit air supply on/off control, a bit air volume control, a rotary speed control, a mode select control that selects on the following drill modes drill/propel/thread, an auto-drill on/off control, and an all motion stop control. Further, the joysticks 80 and 82 can include one or more of the following pipehandling controls 83: a deck wrench control and a breakout wrench control. The joysticks 80 and 82 also include dual track controls 83 that control the operation of the tracks on the blasthole drill. While most of the controls 83 are illustrated as buttons or switches, other types of controls 83 (such as, for example soft keys, touch pads, keys, knobs, etc.) may also be added to or used on or in connection with the joysticks 80 and 82. Although FIGS. 7 and 8 illustrate the joystick controls 83 arranged in a particular manner, it is to be appreciated that other embodiments may include a different arrangement of controls.

The control panel 39 further includes a plurality of configurable displays or gauges 84. The gauges 84 are positioned on the each side of the panel 39, below the monitors 43. The gauges 84 are configured to provide feedback (i.e., by displaying information on a digital display) to the operator regarding specific operations and parameters of the drill 5. For example, the gauges can provide information about the following parameters: pull down force of the drill bit, RO penetration, hydraulic pressure, rotary speed, bit air pressure, and fuel level. The gauges 84 are configured to automatically or manually switch between alternative displays. For example, the operator can manually switch between various displays of a gauge 84. In one embodiment, the operator can use the gauges 84 to communicate with the ECU 41. For example, the operator can adjust specific parameters of the drill 5 through a gauge 84 (e.g., the amount of force on the drill bit). Therefore, even if one or both of the monitors 43 are not functioning, the operator can operate the drill 5 by using only the gauges 84. In this situation, the gauges 84 receive sufficient feedback indicative of the operation of the drill 5 from the ECU 41.

The control panel 39 further includes leveling controls, auxiliary winch controls, pipe rack manipulation controls, pipehandling controls, lighting controls, and steering controls. In one embodiment, the leveling controls include four joysticks 86 positioned on the left side of the control panel 39. Each leveling control (i.e., joystick 86) is connected to an individual leveling jack (not shown) on the drill 5. The leveling controls 86 are configured to level the blasthole drill 5 before an operator starts to drill a hole. The joysticks 86 allow an operator to control each levering jack individually and/or simultaneously with the other jacks by operating all four controls with one hand. The leveling controls also include an "auto-leveling" button 88 positioned on the control panel 39. By pressing the auto-leveling" button 88, the operator requests that the ECU 41 controls all four leveling jacks to bring the blasthole drill to a level position.

The auxiliary winch controls include a button 90 for controlling the winch or hoist mechanism 24. This button 90 is a part of a three way winch/hoist control system. Another element of the winch control system includes a winch control device (not shown) positioned on a cable pendant outside the cab (i.e., on the deck) that can be used to control the winch 24. A third control element is a radio remote control having a winch control function. The pipe rack manipulation controls include a button (not shown) positioned on the right portion of the control panel 39. The pipe rack manipulation control is configured to regulate the length of the drill steel by adding additional steel. The pipehandling controls include a pipe rack over-hole/stored control and a mid-mast support control that are shown as a control 92.

The lighting controls (e.g., switches that are not shown) allow the operator to select and turn on/off various lights on the drill 5 and in the cab 12. The steering controls (not shown) allow the operator to maneuver the drill 5 regardless of the position of the seat 47. The operator's seat module 37 can also include a radio/CD player 98, a cup holder 100, lights 102, and other elements that support the operator during the operation of the drill 5.

Thus, the invention provides, among other things, a seat module and a cab module for an industrial machine. Various features and advantages of the invention are set forth in the following claims.

What is claimed is:

1. A seat module for an industrial machine that includes a base, a body and a cab module supporting the seat module, the seat module comprising:
 a seat;
 a control panel mounted on the seat;
 one or more monitors attached to the control panel;
 a plurality of controls positioned on the control panel;
 a rotatable platform configured to support the seat and the control panel; and
 a controller connected to the control panel, the controller having a processor,
 wherein the controller is configured to receive information from the plurality of controls and to control the operation of the industrial machine based on the received information, wherein the controller is further configured to receive information from a command center, a drilling subsystem, a leveling subsystem, and a drivetrain subsystem to control operations performed by the industrial machine, and wherein operation of the industrial machine is controlled exclusively by the plurality of controls on the control panel.

2. The seat module of claim 1, wherein the seat and the control panel can rotate as a unit at approximately 300 degrees during the operation of the industrial machine.

3. The seat module of claim 1, wherein the one or more monitors include a display screen and are configured to receive video signals from a plurality of cameras.

4. The seat module of claim 1, wherein the one or more monitors are configured to operate as a graphic user interface and to display data associated with the operation of the industrial machine.

5. The seat module of claim 1, wherein the one or more monitors are configured to operate as an input/output interface, and allow an operator to communicate with the controller and send command signals to the controller.

6. The seat module of claim 1, wherein the control panel further includes one or more joysticks configured to control the operation of the industrial machine.

7. The seat module of claim 6, wherein the one or more joysticks are moveable in various directions for steering the industrial machine.

8. The seat module of claim 6, wherein the one or more joysticks are configured to be pushed or pulled, along a slot between fore, neutral, and aft positions, to move drive tracks of the industrial machine.

9. The seat module of claim 6, wherein the one or more joysticks include controls for operating the steering, drilling, pipehandling, and tramming functions of the industrial machine.

10. The seat module of claim 9, wherein the one or more joysticks include one or more of the following drilling controls: a water injection on/off control, a pull down force control, a pull down speed control, a bit air supply on/off control, a bit air volume control, a rotary speed control, a mode select control that selects on the following drill modes drill/propel/thread, an auto-drill on/off control, and an all motion stop control.

11. The seat module of claim 9, wherein the one or more joysticks include one or more of the following pipehandling controls: a deck wrench control, a breakout wrench control, a pipe racks over-hole/stored control, and a mid-mast support control.

12. The seat module of claim 1, wherein the control panel further includes a plurality of configurable gauges.

13. The seat module of claim 12, wherein the gauges are configured to display information regarding specific operations and parameters of the industrial machine.

14. The seat module of claim 12, wherein the gauges are configured to automatically or manually switch between alternative displays.

15. The seat module of claim 12, wherein the gauges are configured to communicate with the controller to adjust specific parameters of the industrial machine.

16. The seat module of claim 1, wherein the control panel further includes a plurality of leveling controls configured to level the industrial machine.

17. The seat module of claim 16, wherein the leveling controls include four joysticks positioned on the control panel, and wherein each joystick is connected to an individual leveling jack on the industrial machine.

18. The seat module of claim 17, wherein the leveling controls further include an auto-leveling button that controls all leveling jacks.

19. A seat module for an industrial machine that includes a base, a body and a cab module supporting the seat module, the seat module comprising:

a seat;
a control panel mounted on the seat;
one or more monitors attached to the control panel;
a plurality of controls positioned on the control panel; and
a controller connected to the control panel, the controller having a processor,
wherein the controller is configured to receive information from the plurality of controls and to control the operation of the industrial machine based on the received information, wherein the control panel further includes a plurality of leveling controls configured to level the industrial machine, wherein the leveling controls include four joysticks positioned on the control panel, and wherein each joystick is connected to an individual leveling jack on the industrial machine.

20. The seat module of claim 19, wherein the leveling controls further include an auto-leveling button that controls all leveling jacks.

* * * * *